Feb. 17, 1931. M. ROHR 1,793,251
PATTERN CHART WITH VARIABLE SIZE INDICATOR
Filed April 13, 1929 3 Sheets-Sheet 2

Inventor
MAYER ROHR.
By His Attorneys

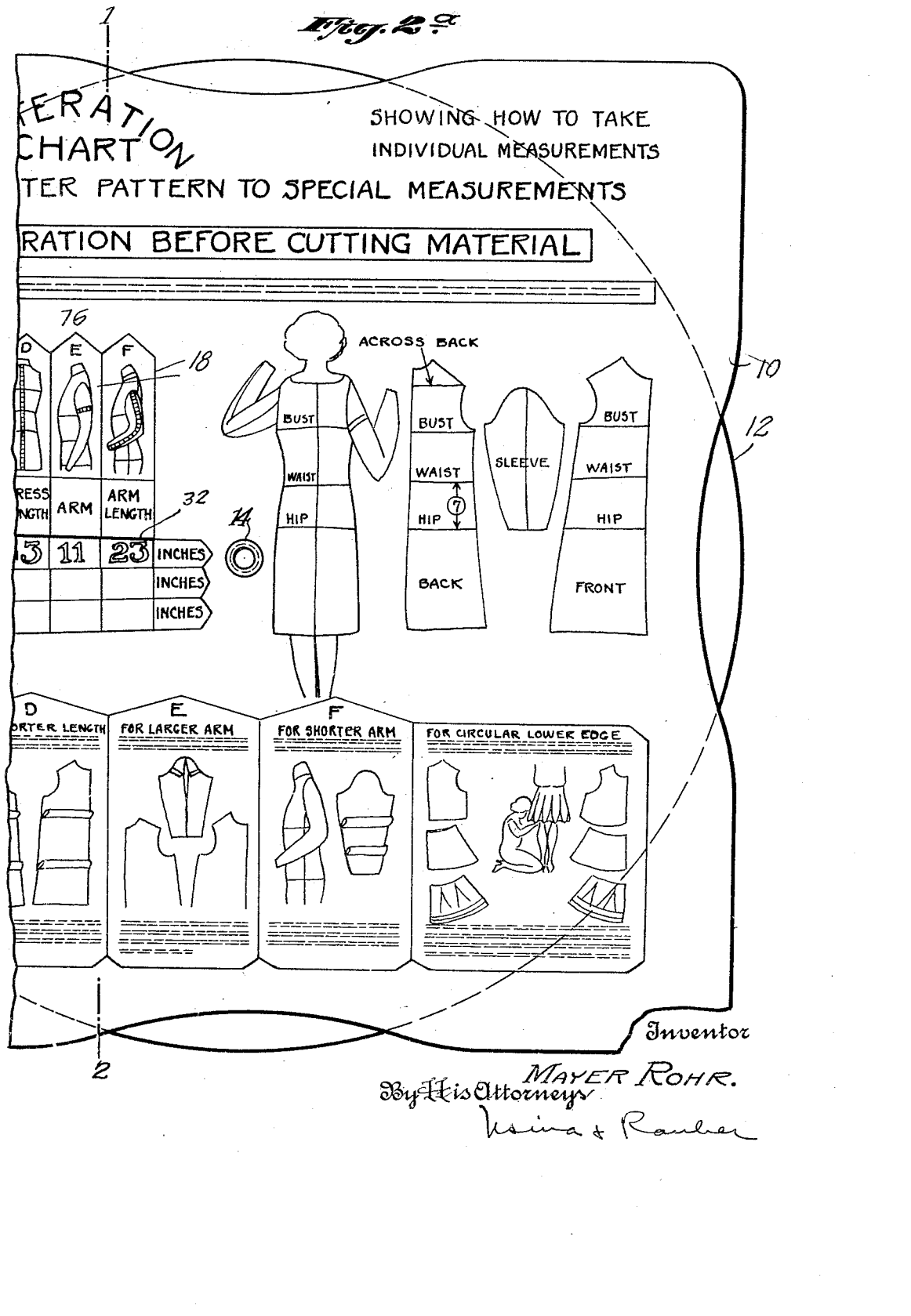

Patented Feb. 17, 1931

1,793,251

UNITED STATES PATENT OFFICE

MAYER ROHR, OF NEW YORK, N. Y., ASSIGNOR TO THE McCALL COMPANY, OF NEW YORK, N. Y., A CORPORATION OF NEW YORK

PATTERN CHART WITH VARIABLE-SIZE INDICATOR

Application filed April 13, 1929. Serial No. 354,972.

This invention relates to a device adapted for guidance in making alterations in garment patterns to suit the individual measurements of a given user. The invention will be apparent from the following specification when read in connection with the accompanying drawings in which.

Figure 1:
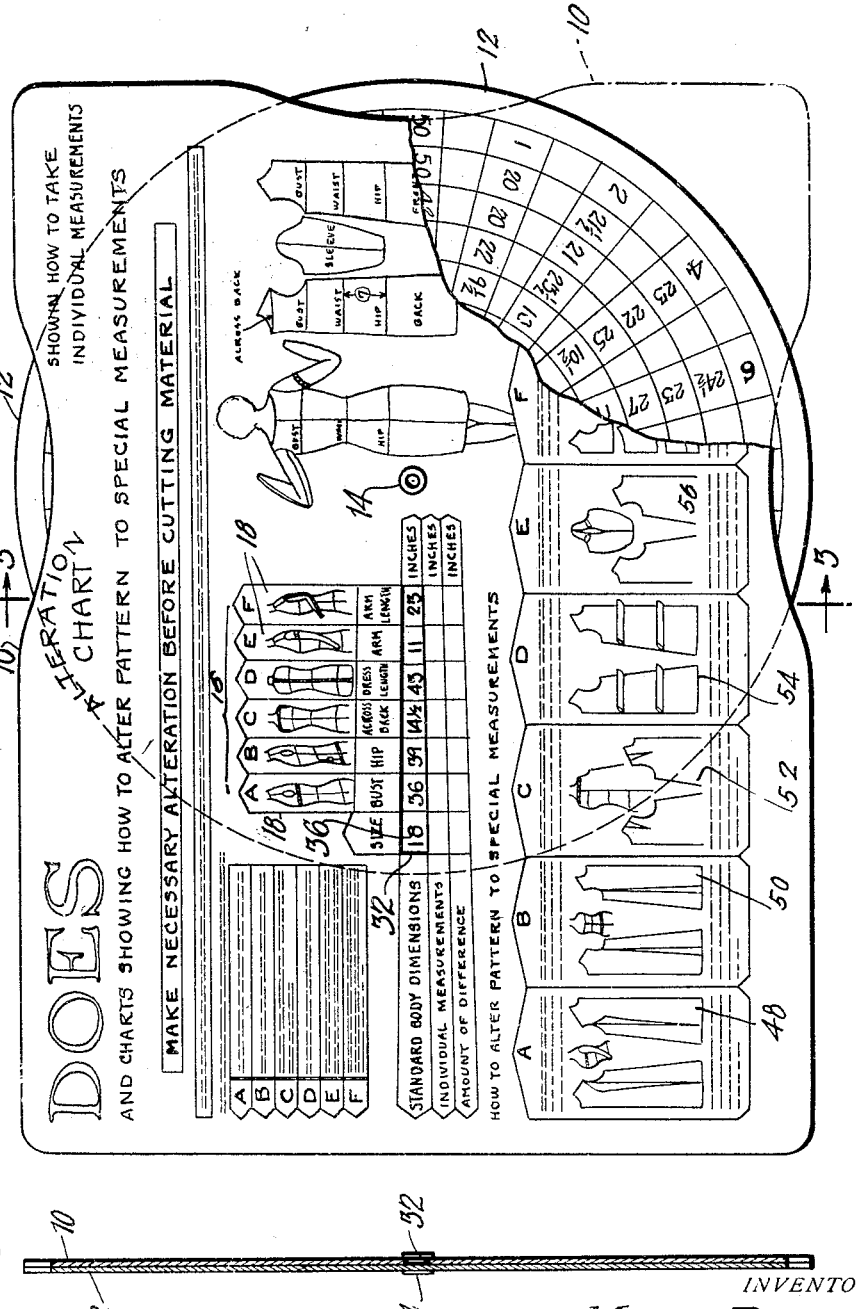
Fig. 1 is a face view of a device embodying the invention, some of the indicia being omitted because of the small scale of the figure.
Figure 2:
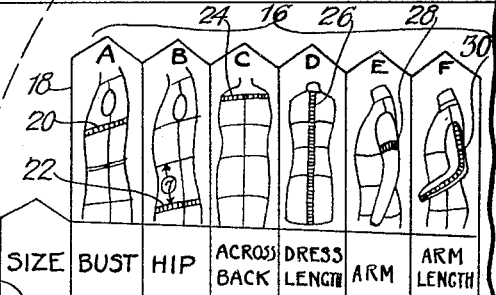
Fig. 2 is an enlarged view of substantially one-half of the device shown in Fig. 1.

Fig. 2ᵃ is a similar view of the other half of the device;

Fig. 3 is a sectional view taken on line 3—3 of Fig. 1.

The device includes a main part 10 and a member 12 movable relatively therewith, the part 10 being in the nature of a chart having printed matter thereon giving explicit directions for the steps necessary to make alterations in a pattern to suit individual requirements and the member 12 being rotatably secured to part 10 by means of a rivet or eyelet 14. This member has printed thereon a plurality of radially arranged rows of figures corresponding to standard paper pattern sizes having standard body dimensions taken at the locations in certain sketches shown on the part 10 hereinafter referred to.

Printed on the chart 10 is a tabular portion 16 including a plurality of printed columns 18 each having an identifying mark at the head of the column. As shown these columns are identified by printed reference letters A, B, C, D, E and F.

A sketch in the column A illustrates, by means of the representation of a tape-measure the location on the body where a measurement is to be taken. In the column A the tape-measure 20 shows the location at which the bust measurement is taken. At the lower part of the column the word "Bust" appears.

Similarly column B indicates at 22 where the hip measurement is to be taken.

Column C shows at 24 where the measurement across the back is to be taken.

Column D shows at 26 the location where the dress length is to be measured.

Column E illustrates at 28 the location at which the arm measurement is to be taken.

Column F shows at 30 the location at which the arm length is to be taken.

Opposite the tabular portion 16 I provide a series of specific directions indicating how to take measurements. These directions are printed in sub-divided areas under the heading "How to take measurements" and each area is identified with a reference character A, B, C, D, E and F so as to key these directions to the sketches in the vertical columns located to the right thereof identified by the same reference letters A to F.

The tabular portion of the chart 10 is formed with an aperture 32 which extends transversely of the columns A to F inclusive. In alignment with this aperture a legend 34 is printed on the chart which reads, "Standard body dimensions".

The radial distance between the numerals in each row on the member 12 is such that the standard body dimensions can be brought into register with the columns A to F inclusive above referred to.

The outermost figure on the member 10, as indicated at 36, is a general size designation. This number corresponds to a standard pattern size. With the setting of the member 12 illustrated in Fig. 2 the device is ready for use to alter a standard pattern known as size 18. The radial row of figures exposed to view in Fig. 2 shows standard bust measurement 36, hip measurement 39, across back dimension 14½, dress length 43, arm size 11, arm length 23. These figures are standard body dimensions taken at the locations indicated at the points 20, 22, 24, 26, 28 and 30 in the sketches aligned with the dimensions on the member 12. These standard dimensions are those upon which standard paper patterns of commerce are based.

Naturally all individuals cannot be accurately fitted by following such standard or uniform dimensions. It therefore becomes necessary to make individual adjustments in the standard paper patterns. With the aid of the device of my invention herein described such individual measurements can be accurately taken and compared with any selected group of standard pattern dimensions in the radial rows on the member 12 the amount of difference between the individual measurements and the standard dimensions can be entered for guidance in altering the paper pattern. For this purpose the chart is provided with a number of sub-divisions 38, 40, 42, 44 and 46 in which the user is adapted to enter her individual measurements taken at the body locations indicated at 20, 22, 24, 26, 28 and 30 in the sketches of columns A to F inclusive. In line with the subdivisions 38 to 46 the legend "Individual measurement" is printed on the chart. Below this legend there is provided another legend headed "Amount of difference". Below the sub-divisions 38 to 46 there is a row of sub-divisions 39, 41, 43 and 45 in which the user is adapted to enter the discrepancy, if any, between the standard dimensions which show through the aperture 32 and the individual measurements entered in the sub-divisions 38 to 46 inclusive.

The chart 10 has printed thereon a number of diagrams as indicated at 48, 50, 52, 54 and 56. These diagrams are headed A, B, C, D, E and F and contain both pictorial and printed directions for instructing the user exactly how to proceed to alter the paper pattern pieces to compensate for the amount of difference entered in the sub-divisions of the vertical columns A to F.

By turning the member 12 about its pivotal support 14 it will be understood that any desired row of standard body dimensions can be brought into view. Thus a single chart can be used for guidance in altering every stock size pattern made and sold by a given manufacturer.

The member 12 need not necessarily be a rotary member. Nor is it necessary to provide a chart with an apertured portion. If desired the member 12 can be movably supported with respect to the chart 10 and the same can have a transparent area arranged to expose to view one row of standard body dimensions at a given time. For example the chart could be printed on material the greater portion of which is opaque but having a transparent area for exposing to view a given row of standard body measurements.

While I have described quite specifically the details of the embodiment of the invention herein illustrated it is not to be construed that I am limited thereto since various modifications may be made by those skilled in the art without departing from the invention as defined in the appended claims.

1. A chart adapted for guidance in altering garment patterns having a series of body sketches arranged alongside one another in separate columns, each sketch illustrating a body location at which a measurement is to be taken, a member mounted for movement relatively to the chart and having a plurality of rows of indicia representing standard body dimensions taken at the corresponding locations indicated on said sketches, the chart being arranged to expose to view any selected row of said indicia representing body dimensions, the said dimensions being spaced to register with said columns.

2. A chart having a series of sketches thereon, each indicating a body location at which a measurement is taken, a tabular portion on said chart having columns aligned with said sketches, said columns having sub-divisions for the entry of measurements, a member movable relatively to the chart and having a restricted area exposed to view through the chart, said member having a plurality of rows of indicia representing standard body dimensions thereon adapted to be brought into register with said columns.

3. A device for guidance in making alterations in garment patterns to fit a given user, comprising a chart having delineated thereon a plurality of sketches each illustrating a location on the body where a measurement is taken, a tabular portion on the chart having columns corresponding with said sketches, the tabular portion being apertured transversely of said columns, a member movable relatively to the chart having a restricted area exposed to view through the aperture in the chart, said member having a plurality of rows of indicia representing standard body dimensions thereon arranged to be brought into register with said columns.

4. A device adapted for guidance in making alterations in garment patterns to suit the individual measurements of a user, comprising a chart having delineated thereon a series of sketches each indicating a body location at which a measurement is to be taken, a tabular portion on the chart having columns aligned with said sketches, the tabular portion being apertured transversely of said columns, a member pivotally mounted on the chart and having a plurality of rows of indicia representing standard body dimensions thereon adapted to be moved into register with the apertured portion, the dimensions in each row being spaced to correspond with the columns.

5. The device of claim 4 in which the columns of the chart have sub-divisions for the entry of measurements adapted to be compared with the standard body dimensions when said member is moved to expose a determined row of said body dimensions to view.

6. The device of claim 3 wherein the pivot for said movable member is substantially in alignment with the center of the apertured portion of the chart and wherein each row of indicia representing standard body dimensions extends substantially in a radial line from the pivotally mounted member, the radial spacing of said dimensions corresponding to spacing of said columns.

7. A chart having a series of sketches, each illustrating a body location at which a measurement is to be taken, a member mounted for rotary movement relatively to the chart and having a plurality of substantially radial rows of indicia representing standard body dimensions taken at locations indicated on said sketches, the chart having an apertured portion adapted to expose to view any selected row of body dimensions on said member, the individual body dimensions of each row being arranged to register with corresponding sketches on the chart.

In witness whereof, I have hereunto signed my name.

MAYER ROHR.